(12) United States Patent
Nelson

(10) Patent No.: US 8,745,814 B2
(45) Date of Patent: Jun. 10, 2014

(54) WIPER WITH RECIPROCATING CLEANING APPARATUS

(75) Inventor: James Q. Nelson, Salt Lake City, UT (US)

(73) Assignee: Nelson and Nelson Enterprises, LLC, Salt Lake City, UT (US)

( * ) Notice: Subject to any disclaimer, the term of this patent is extended or adjusted under 35 U.S.C. 154(b) by 651 days.

(21) Appl. No.: 12/705,221

(22) Filed: Feb. 12, 2010

(65) Prior Publication Data

US 2011/0197381 A1   Aug. 18, 2011

(51) Int. Cl.
*A47L 1/00* (2006.01)

(52) U.S. Cl.
USPC ............... 15/250.41; 15/250.23; 15/250.4

(58) Field of Classification Search
USPC ............ 15/250.4, 250.41, 250.361, 250.23, 15/250.21, 250.29, 250.39
IPC .................................. B60S 1/38, 1/28, 1/44
See application file for complete search history.

(56) References Cited

U.S. PATENT DOCUMENTS

| | | | |
|---|---|---|---|
| 1,197,763 | A | 9/1916 | Plotnitzky |
| 2,289,545 | A | 4/1940 | Horton et al. |
| 2,648,087 | A | 8/1953 | Kiker, Jr. |
| 2,712,148 | A | 7/1955 | Cheshire |
| 2,719,994 | A | 10/1955 | Dorsey |
| 2,784,437 | A | 3/1957 | Haas |
| 2,787,803 | A | 4/1957 | Cella |
| 3,080,592 | A | 3/1963 | Hassage |
| 3,422,484 | A | 1/1969 | Carpenter |
| 3,790,083 | A | 2/1974 | Redifer |
| 3,887,955 | A | 6/1975 | Jarvinen |
| 3,892,006 | A | 7/1975 | Yasumoto |
| 3,906,583 | A | 9/1975 | Murphy |
| 3,939,524 | A | 2/1976 | Knights |
| 4,019,216 | A | 4/1977 | Priesemuth |
| D257,339 | S | 10/1980 | Ellinwood |
| 4,342,129 | A | 8/1982 | Thompson |
| 4,567,621 | A | 2/1986 | Alley, Jr. |
| 4,611,364 | A | 9/1986 | Grubner |
| 4,649,593 | A | 3/1987 | Gilliam, III et al. |

(Continued)

FOREIGN PATENT DOCUMENTS

| | | |
|---|---|---|
| DE | 2700527 | 9/1978 |
| DE | 3934460 | 8/1990 |

(Continued)

OTHER PUBLICATIONS

U.S. Appl. No. 12/248,732, filed Mar. 31, 2011, Office Action.

(Continued)

*Primary Examiner* — Joshua J Michener
*Assistant Examiner* — Charissa Ahmad
(74) *Attorney, Agent, or Firm* — Workman Nydegger

(57) ABSTRACT

A scrubber assembly includes a scrubber support structure, an elongated scrubber element and a motor. The scrubber support structure is configured to attach to a windshield wiper. The scrubber element is movably attached to the scrubber support structure and extends between a first end and a spaced apart second end along a central longitudinal axis. The motor is mounted to the scrubber support structure and is engaged with the scrubber element to reciprocally move the scrubber element along the central longitudinal axis. A portable power source mounted to the scrubber support structure may provide power to the motor.

20 Claims, 13 Drawing Sheets

(56) References Cited

U.S. PATENT DOCUMENTS

| | | | |
|---|---|---|---|
| 4,719,661 A | 1/1988 | Hanselmann | |
| 4,745,653 A | 5/1988 | Bliznak | |
| 4,754,517 A | 7/1988 | Aldous | |
| 5,166,587 A | 11/1992 | Smart | |
| 5,168,595 A * | 12/1992 | Naylor, Jr. | 15/250.4 |
| 5,235,720 A | 8/1993 | Kinder | |
| 5,255,407 A | 10/1993 | Yang | |
| 5,301,384 A | 4/1994 | Perry | |
| 5,323,508 A | 6/1994 | Sheldrake | |
| D349,082 S | 7/1994 | Brabender | |
| 5,406,672 A | 4/1995 | Hipke | |
| 5,442,834 A | 8/1995 | Perry | |
| 5,463,790 A | 11/1995 | Chiou et al. | |
| 5,497,528 A | 3/1996 | Wu | |
| 5,634,841 A | 6/1997 | Gold | |
| 5,778,483 A | 7/1998 | Dawson | |
| 5,802,661 A | 9/1998 | Miller et al. | |
| 5,979,010 A | 11/1999 | Dockery | |
| 5,983,440 A | 11/1999 | Remington | |
| 5,996,168 A | 12/1999 | Watkins | |
| 6,279,193 B1 | 8/2001 | Cheng | |
| 6,505,378 B1 | 1/2003 | Squires | |
| D469,731 S | 2/2003 | Geer | |
| 6,536,069 B1 * | 3/2003 | Neag et al. | 15/250.14 |
| 6,687,946 B2 | 2/2004 | Reddoch | |
| 6,748,621 B1 | 6/2004 | Root | |
| 6,763,546 B1 | 7/2004 | Smith | |
| 7,111,355 B1 * | 9/2006 | Sorensen | 15/250.04 |
| 7,140,064 B1 | 11/2006 | Woolstenhulme | |
| 7,302,732 B2 | 12/2007 | Alley | |
| 7,334,288 B2 | 2/2008 | Rudd et al. | |
| 7,461,429 B2 | 12/2008 | Huang | |
| 7,503,091 B2 | 3/2009 | White et al. | |
| 7,574,769 B1 * | 8/2009 | Nemeth | 15/250.003 |
| 7,707,681 B1 * | 5/2010 | Cabak | 15/250.41 |
| 7,827,652 B2 | 11/2010 | Yang et al. | |
| 7,836,541 B2 | 11/2010 | Harita et al. | |
| 7,845,044 B2 | 12/2010 | Park | |
| 7,900,312 B2 * | 3/2011 | Chaise et al. | 15/250.04 |
| 8,028,368 B2 | 10/2011 | Chien | |
| 8,032,976 B2 | 10/2011 | Nelson | |
| 8,104,137 B2 | 1/2012 | An et al. | |
| 8,181,308 B2 | 5/2012 | Kwon et al. | |
| 8,261,405 B2 | 9/2012 | Kim et al. | |
| 8,375,504 B2 | 2/2013 | Kim et al. | |
| 8,413,291 B2 | 4/2013 | Wu | |
| 8,505,153 B2 * | 8/2013 | Nelson | 15/250.41 |
| 2002/0073493 A1 | 6/2002 | Walton | |
| 2002/0092114 A1 | 7/2002 | Reddoch | |
| 2002/0129458 A1 | 9/2002 | Hsieh | |
| 2003/0141622 A1 * | 7/2003 | Winters | 264/138 |
| 2003/0229960 A1 | 12/2003 | Stouder | |
| 2004/0177465 A1 * | 9/2004 | Steffee et al. | 15/250.41 |
| 2006/0000044 A1 | 1/2006 | de La Pena Razquin | |
| 2006/0064840 A1 | 3/2006 | Park | |
| 2006/0282972 A1 | 12/2006 | Huang | |
| 2007/0017055 A1 | 1/2007 | Simko | |
| 2007/0022558 A1 | 2/2007 | Petkov | |
| 2007/0044259 A1 | 3/2007 | White et al. | |
| 2007/0094831 A1 | 5/2007 | Huguley | |
| 2007/0266516 A1 | 11/2007 | Cakmak | |
| 2008/0034528 A1 | 2/2008 | Bourke | |
| 2008/0034531 A1 | 2/2008 | Beaver | |
| 2008/0276402 A1 | 11/2008 | Chaise | |
| 2010/0139027 A1 | 6/2010 | An et al. | |
| 2010/0242204 A1 | 9/2010 | Chien | |
| 2011/0197381 A1 | 8/2011 | Nelson | |
| 2011/0197387 A1 | 8/2011 | Nelson | |
| 2013/0180074 A1 * | 7/2013 | Nelson | 15/250.202 |
| 2013/0180544 A1 * | 7/2013 | Nelson | 134/6 |
| 2013/0180545 A1 * | 7/2013 | Nelson | 134/6 |

FOREIGN PATENT DOCUMENTS

| | | | | |
|---|---|---|---|---|
| DE | 102008042706 A1 * | 4/2010 | | |
| EP | 1034992 A2 * | 9/2000 | | B60S 1/38 |
| GB | 2201585 | 9/1988 | | |
| GB | 2267816 | 12/1993 | | |
| JP | 9-76881 | 3/1997 | | |
| WO | 80/01155 | 6/1980 | | |
| WO | 83/02756 | 8/1983 | | |
| WO | 89/00396 | 1/1989 | | |
| WO | 93/09979 | 5/1993 | | |

OTHER PUBLICATIONS

U.S. Appl. No. 12/248,732, filed Aug. 1, 2011, Notice of Allowance.
U.S. Appl. No. 13/044,132, filed Jun. 16, 2011, Office Action.
U.S. Appl. No. 12/705,265, filed Jun. 13, 2012, Office Action.
U.S. Appl. No. 12/705,265, filed Nov. 28, 2012, Final Office Action.
U.S. Appl. No. 12/705,265, filed Jun. 3, 2013, Notice of Allowance.
U.S. Appl. No. 12/705,265, filed Jul. 1, 2013, Notice of Allowance.
U.S. Appl. No. 13/351,912, filed Jun. 28, 2013, Office Action.
U.S. Appl. No. 13/351,976, filed Sep. 30, 2013, Office Action.

* cited by examiner

WIPER WITH RECIPROCATING CLEANING APPARATUS

CROSS-REFERENCE TO RELATED APPLICATIONS

Not Applicable.

BACKGROUND OF THE INVENTION

1. The Field of the Invention

The present invention relates to wipers having a wiper blade and an additional movable scrubber element attached thereto.

2. The Relevant Technology

Almost all motor vehicles sold today come with a standard set of windshield wipers. Conventional windshield wipers typically include a wiper blade made of rubber or the like, which is attached to a wiper support structure designed so as to cause the wiper blade to remain in contact with the windshield surface. The wiper support structure is attached to a wiper arm that attaches the windshield wiper to the motor vehicle. During use, the wiper arm causes the wiper support structure to move back and forth across the windshield. This causes the wiper blade to push the rain, snow, or other debris away from the forward field of view of the driver. This, of course, is necessary so the driver can see the road ahead while driving during inclement weather. When the windshield becomes dirty while there is no precipitation, the driver can activate a washer pump that causes washer fluid to flow through a fluid line and spray onto the windshield to help the windshield wipers remove the debris.

If the view through the windshield becomes blocked or even obscured for whatever reason, it can impact the driver's view and create a dangerous situation. This can occur, for example, when the windshield wiper stops working or when the wiper blades become worn. It can also occur when something hits the windshield that the windshield wiper is not able to remove, even when using washer fluid. The latter can occur, for example, when a car passes through a swarm of insects that splatter all over the windshield.

To aid in these situations, various after-market windshield wipers have been designed that can replace stock windshield wipers that come with the vehicle. These replacement windshield wipers include scrubbing pads designed to scrub the windshield as the windshield wiper passes back and forth over the windshield. The scrubbing pads help remove the foreign matter from the windshield, but are not always enough to remove all of the foreign matter.

To help in the scrubbing action, various windshield wipers have been designed to include a motor powered by the car battery that can rotate the scrubber. While this can improve the scrubbing action, it also has some disadvantages. For example, the rotary movement of the scrubber can cause foreign matter to be flipped up and onto another portion of the windshield. Furthermore, the rotary design of the scrubber can result in a support structure that is fairly complicated with a scrubber that is much larger than the wiper blade. In addition, the motor must have electrical wires run to it from the car. As a result, when replacing the original windshield wipers a technician or other qualified person must modify the automobile to position and run the wires to the new windshield wiper, which can be expensive and time consuming. The cost of the motor can also cause the windshield wipers to be relatively expensive, especially if the motor must be replaced every time the scrubber is replaced.

Accordingly, what is needed are windshield wipers that can provide more scrubbing action for hard to remove debris and that can easily replace or augment conventional windshield wipers without requiring much installation expertise.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope. In the drawings, like parts are given like reference numerals.

DETAILED DESCRIPTION OF THE PREFERRED EMBODIMENTS

As used in the specification and appended claims, directional terms, such as "top," "bottom," "left," "right," "up," "down," "upper," "lower," and the like are used herein solely to indicate relative directions in viewing the drawings and are not intended to limit the scope of the claims in any way.

Figure 1:
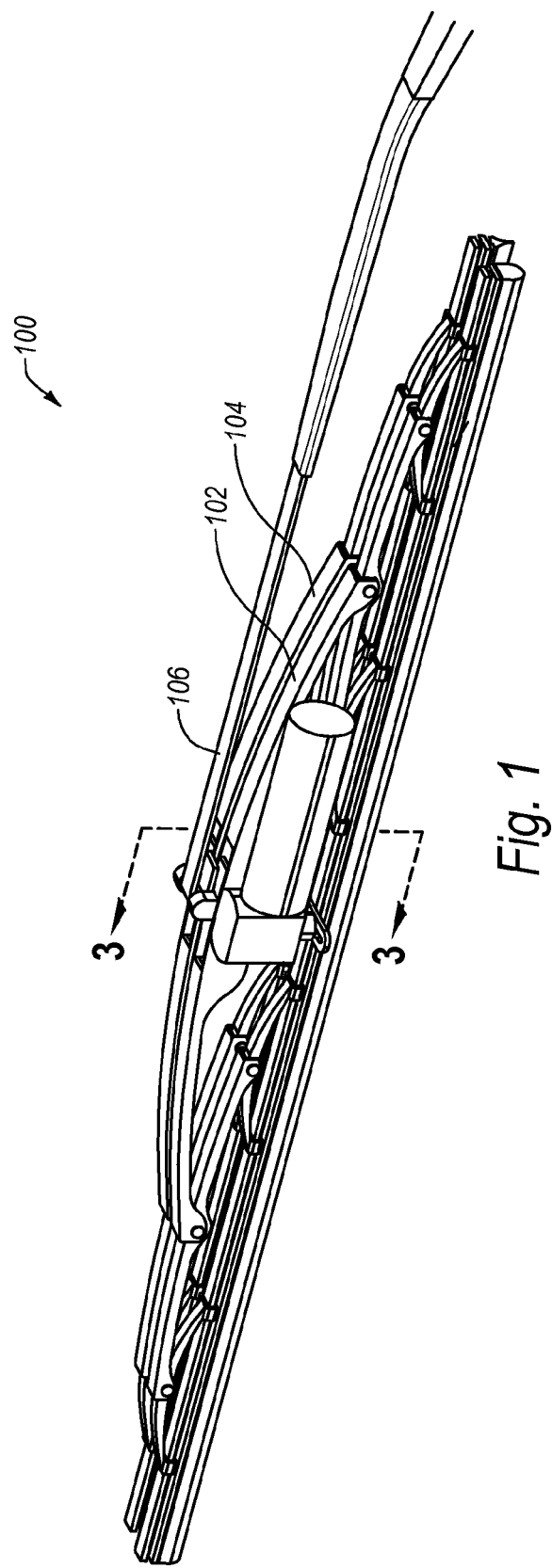
FIG. 1 is a front perspective view of a windshield wiper according to one embodiment of the present invention.
Figure 2:
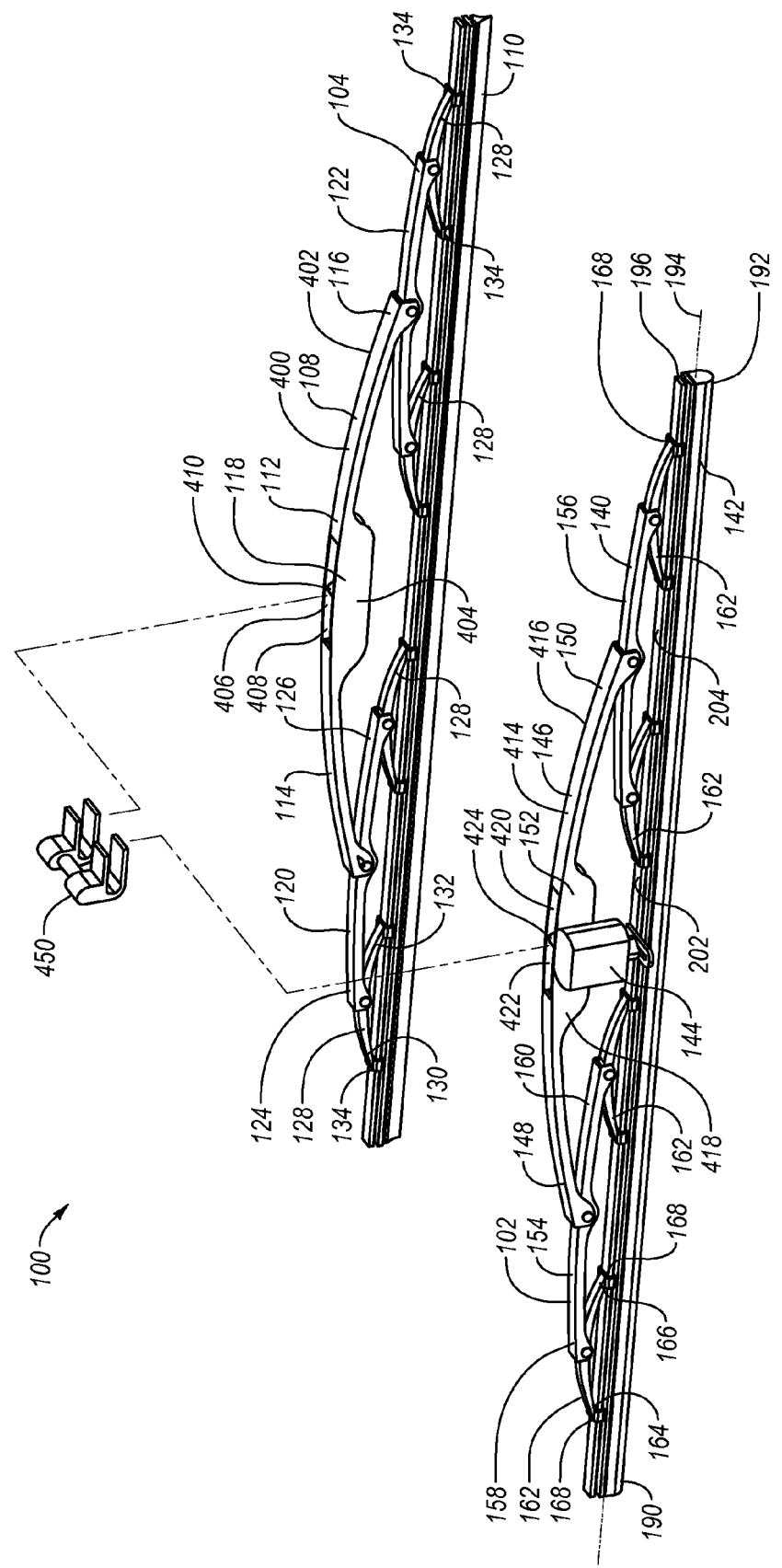
FIG. 2 is an exploded perspective view of the windshield wiper shown in FIG. 1 with the power supply removed for clarity.
Figure 3:
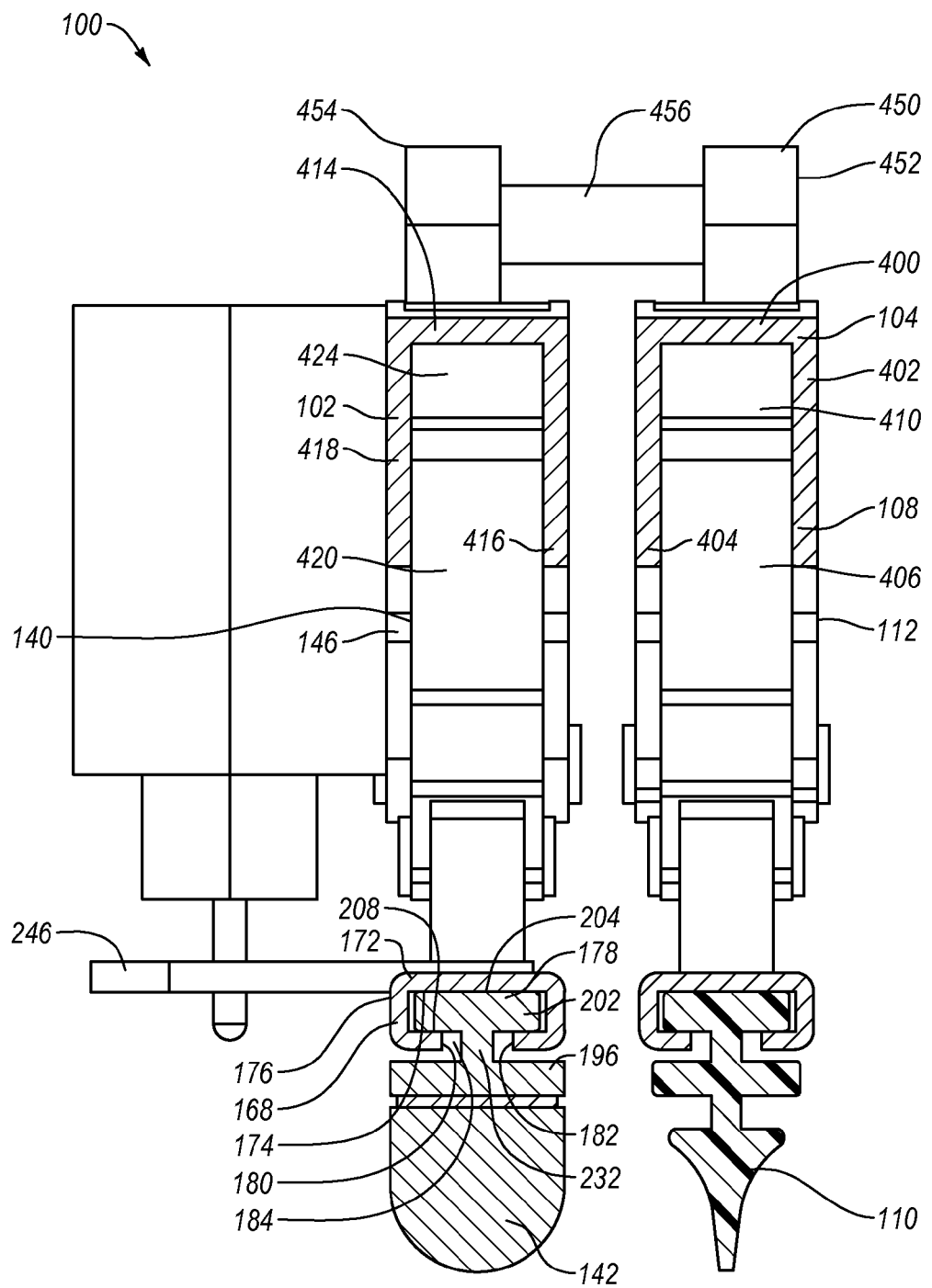
FIG. 3 is a cross sectional end view of the windshield wiper shown in FIG. 1, with the power supply removed for clarity.

Depicted in FIGS. 1-3 is one embodiment of a windshield wiper 100 incorporating features of the present invention. Windshield wiper 100 comprises a scrubber assembly 102 attached to or formed with a wiper assembly 104 of the type generally known within the art and configured to attach to a wiper arm 106 of a vehicle.

As shown in FIG. 2, wiper assembly 104 comprises a wiper support structure 108 having a wiper blade 110 attached thereto. Wiper support structure 108 has an articulated main cross-member 112 extending between a first end 114 and a spaced apart second end 116. As best shown in FIG. 3, main cross member 112 comprises a top wall 400 with a first side wall 402 and an opposing second side wall 404 extending down from either side of top wall 400 so as to form a channel 406 therebetween.

Returning to FIG. 2, top wall 400, first side wall 402, and second side wall 404 all extend between first and second ends 114 and 116. At a center section 118 of cross member 112, a portion of top wall 400 is omitted so as to form a mouth 408 that permits open access to channel 406. In center section 118, a cylindrical cross member 410 extends between first and second side walls 402 and 404 within channel 406. As is known in the art, cross member 410 is designed to receive an end of wiper arm 106 or an adapter that attaches to both cross member 410 and wiper arm 106, thereby securing wiper assembly 104 to wiper arm 106.

Wiper support structure 108 also includes a pair of primary cross arms 120, 122, flexibly attached to first and second ends 114, 116 of cross member 112. Each primary cross arm 120, 122 extends between a first end 124 and a spaced apart second end 126. A plurality of secondary cross arms 128 are also included, each extending from a first end 130 to a spaced apart second end 132. Each of the secondary cross arms 128 is positioned at a different one of the first and second ends 124 and 126 of each primary cross arm 120 and 122. As such, there are four secondary cross arms 128 in the depicted embodiment. A mounting bracket 134 is formed at each end 130, 132 of each secondary cross arm 128. Wiper support structure 108 is configured such that all of the mounting brackets 134 are aligned. Other configurations of wiper support structure 108, as are known in the art, can also be used.

Wiper blade 110 is a thin, typically rubber blade that is received within mounting brackets 134 so as to face the windshield of a vehicle and contact the windshield when the wiper assembly 104 has been installed. Virtually any wiper blade known in the art can be used with the present invention.

Continuing with FIG. 2, scrubber assembly 102 comprises a scrubber support structure 140, a scrubber element 142 movably attached to scrubber support structure 140, and a motor 144 mounted to scrubber support structure 140.

Scrubber support structure 140 is similar to wiper support structure 108 discussed previously. As such, scrubber support structure 140 has an articulated main cross member 146 extending between a first end 148 and a spaced apart second end 150. As best shown in FIG. 3, similar to main cross member 112, main cross member 146 comprises a top wall 414 with a first side wall 416 and an opposing second side wall 418 extending down from either side of top wall 414 so as to form a channel 420 therebetween.

Returning to FIG. 2, Top wall 414, first side wall 416, and second side wall 418 all extend between first and second ends 148 and 150. At a center section 152 of cross member 112, a portion of top wall 414 is omitted so as to form a mouth 422 that permits open access to channel 420. In center section 152, a cylindrical cross member 424 extends between first and second side walls 416 and 418 within channel 420. Similar to cross member 410, cross member 424 can be designed to receive an end of wiper arm 106. Alternatively, cross member 424 can be designed to receive or otherwise incorporate a means for attaching scrubber assembly 102 to wiper assembly 104 and/or a means for attaching windshield wiper 100 to wiper arm 106, as discussed below.

Scrubber support structure 140 also includes a pair of primary cross arms 154, 156, flexibly attached to first and second ends 148, 150 of cross member 146. Each primary cross arm 154, 156 extends between a first end 158 and a spaced apart second end 160. A plurality of secondary cross arms 162 are also included, each extending from a first end 164 to a spaced apart second end 166. Each of the secondary cross arms 162 is positioned at a different one of the first and second ends 158 and 160 of each primary cross arm 154 and 156. As such, there are four secondary cross arms 162 in the depicted embodiment. A mounting bracket 168 is formed at each end 164, 166 of each secondary cross arm 162. Similar to wiper support structure 108, scrubber support structure 140 is configured such that all of the mounting brackets 168 are aligned.

Turning to FIG. 3, each mounting bracket 168 is substantially "c" shaped, with the opening of the "c" facing downward and away from the cross members and cross arms. As such, each mounting bracket 168 comprises an encircling sidewall 172 having an inner surface 174 and an opposing outer surface 176. The inner surface 174 bounds a passageway 178 that extends laterally through the mounting bracket 168. Opposing end faces 180, 182 extend between the inner and outer surfaces 174 and 176 of the sidewall 172 so as to bound an opening 184 that extends through the wall 172 thereby giving mounting bracket 168 its "c" shape. The end faces 180, 182 face each other across opening 184. Mounting brackets 168 are aligned so that scrubber element 142 can be received within passageways 178 of all of the mounting brackets 168, as discussed below and shown in FIG. 2. Furthermore, brackets 168 are positioned so that the openings 184 of all of the mounting brackets 168 face the same direction.

Other configurations of scrubber support structure 140, including mounting brackets 168 as are known in the art, can also be used. All or portions of scrubber support structure 140 can be made of metal, plastic, or other substantially rigid materials. In some embodiments, scrubber support structure is made of plastic using an injection molding process. In some embodiments, a conventional wiper support structure is used as the scrubber support structure.

Figure 4:
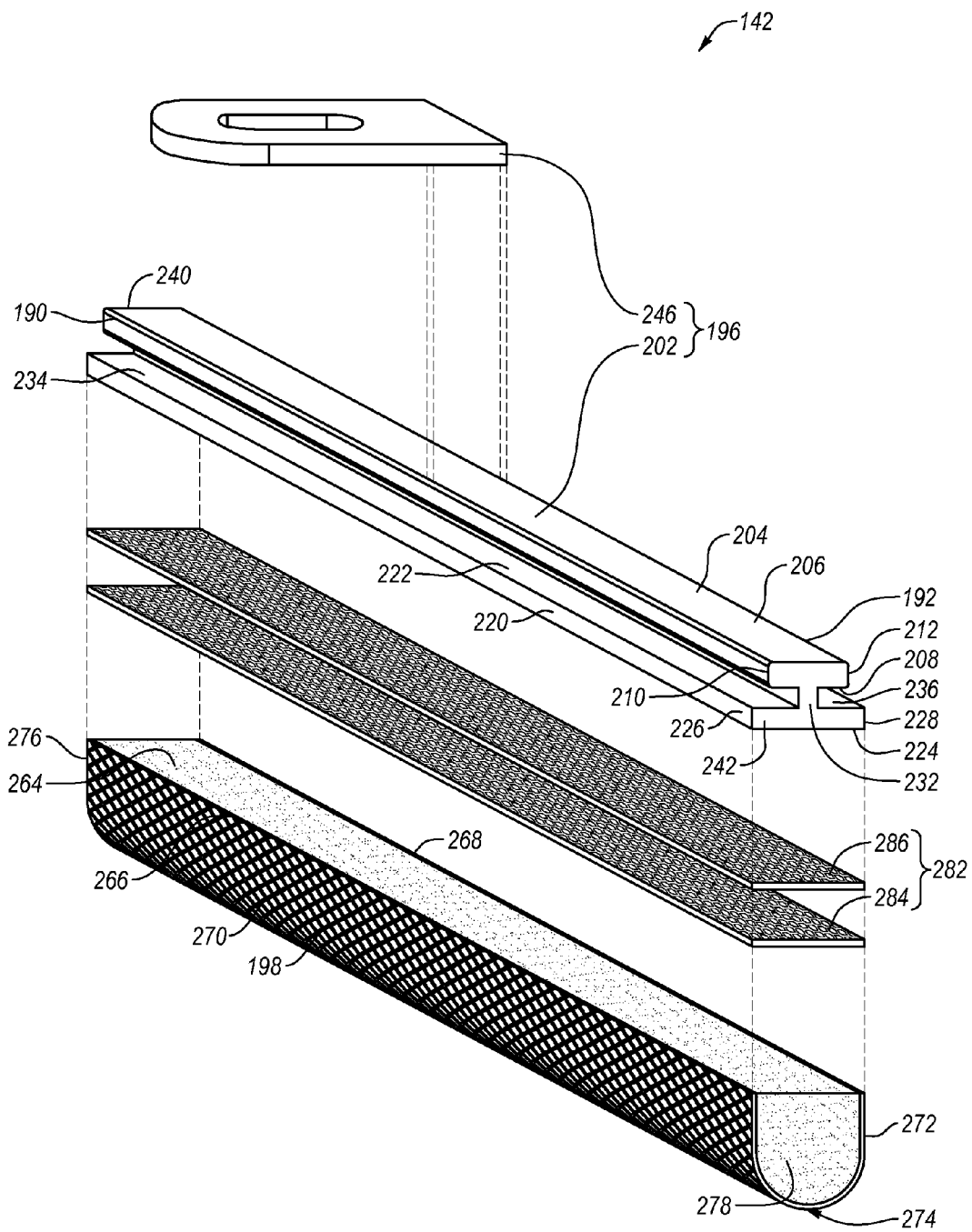
FIG. 4 is an exploded perspective view of the scrubber element shown in FIG. 1.

As shown in FIG. 2, scrubber element 142 extends between a first end 190 and a spaced apart second end 192 along a central longitudinal axis 194. Turning to FIG. 4, scrubber element 142 comprises an elongated reciprocating assembly 196 that includes a scrubbing member 198, and means for removably attaching scrubbing member 198 to reciprocating assembly 196.

Reciprocating assembly 196 comprises a reciprocating member 202 having a top portion 204 that is sized to be slidably received within passageway 178 of all of the mounting brackets 168. To that end, top portion 204 has a cross sectional shape that is generally the same shape as passageway 178. As such, top portion 204 comprises a top surface 206 and an opposing bottom surface 208 with two side surfaces 210, 212 extending therebetween. Top and bottom surfaces 206 and 208 and side surfaces 210 and 212 all extend along the longitudinal axis 194 between first end 190 and second end 192.

Reciprocating member 202 also comprises a bottom portion 220 also extending between first end 190 and second end 192. Bottom portion 220 has a top surface 222 and opposing bottom surface 224 with two side surfaces 226, 228 extending therebetween. In the depicted embodiment, bottom portion 220 is wider than top portion 204, although this is not required. A connecting portion 232 extends between bottom surface 208 of top portion 204 and top surface 222 of bottom portion 220 so as to form a pair of channels 234, 236 on either side of reciprocating member 202 that extends between first and second ends 190 and 192. Top portion 204, bottom portion 220, and connecting portion 232 combine at first and second ends 190 and 192 to respectively form a proximal end face 240 and a distal end face 242. The channels are formed such that the reciprocating member has a generally "I" shaped cross section, as shown by the end faces 240 and 242.

Reciprocating assembly 196 further comprises a receiving member 246 extending laterally away from top portion 204 of reciprocating member 202. Receiving member 246 can be attached to top member 204 or integrally formed therewith. Furthermore, although receiving member 246 is depicted as being disposed about midway between first and second ends 190 and 192 of reciprocating member 202, this is not required. Receiving member 246 is aligned with motor 144 when both are mounted on scrubber support structure 140, as shown in FIG. 2 and discussed in more detail below.

Figure 5:
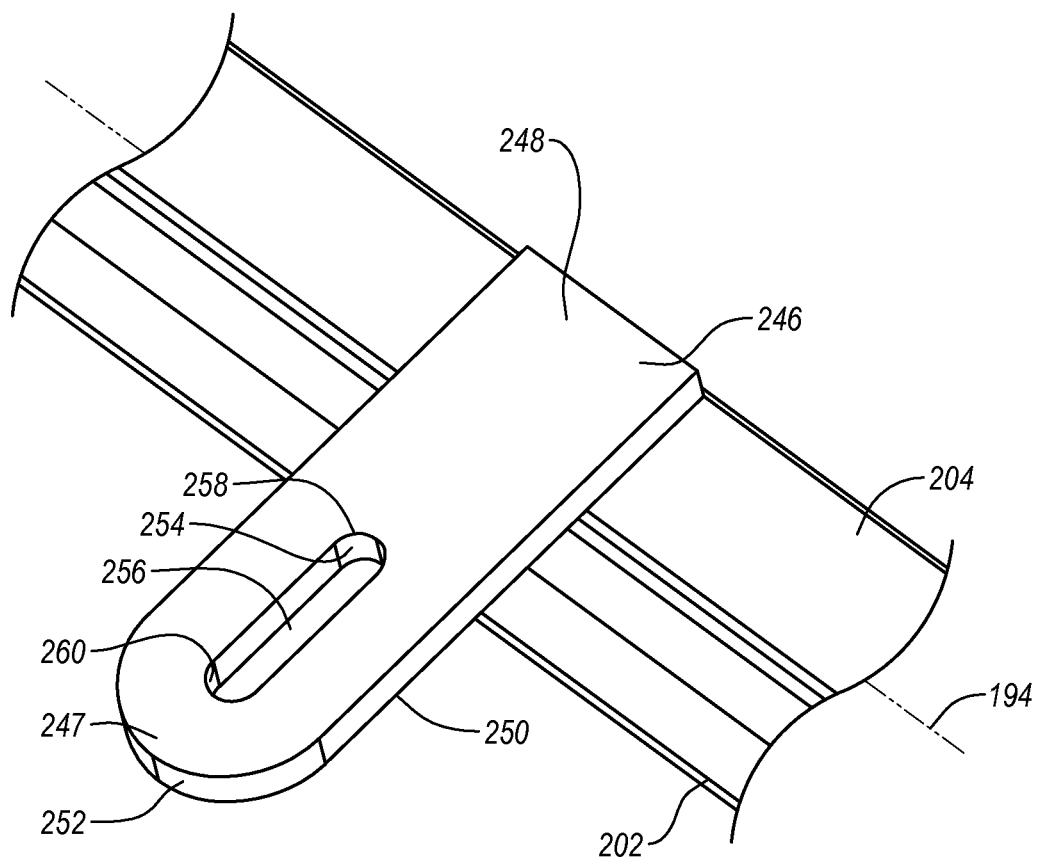
FIG. 5 is a top perspective view of a portion of the reciprocating assembly shown in FIG. 4, showing details of the receiving member.

Turning to FIG. 5, receiving member 246 comprises a tab that is positioned on top portion 204 of reciprocating member 202 and projects away from reciprocating member 202 to a distal end 247 in a direction orthogonal to the central longitudinal axis 194. Tab 246 comprises a top surface 248 and an opposing bottom surface 250 with a perimeter side surface 252 extending therebetween. Tab 246 also includes an inner sidewall 254 extending completely through tab 246 between top and bottom surfaces 248 and 250 so as to bound an elongated aperture 256 running substantially orthogonal to the central longitudinal axis 194. Aperture 256 extends between a first end 258 and a second end 260. The length of aperture 256, defined as the distance between the first and second ends 258 and 260 and measured orthogonally to the central longitudinal axis 194, is substantially longer than the width thereof.

Returning to FIG. 3, reciprocating assembly 196 is installed on scrubber support structure 140 so that top portion 204 of reciprocating member 202 is inserted into the passageways 178 of mounting brackets 168. This can be done in a number of ways. In some embodiments, reciprocating member 202 is inserted into mounting brackets 168 after the scrubber support structure 140 has been fully assembled. This can be done by starting at one end of the scrubber support structure 140 and sliding the top portion 204 of reciprocating member 202 through all of the mounting brackets 168 in series in a manner similar to how a new wiper blade is installed in a conventional wiper support structure 108. This approach to mounting reciprocating member 202 to scrubber support structure can be used, e.g., if receiving member 246 is able to be attached to top portion 204 after reciprocating member 202 is mounted on scrubber support structure 140.

In other embodiments, reciprocating member 202 is inserted into mounting brackets 168 before scrubber support structure 140 has been fully assembled. In this approach, top portion 204 is inserted into mounting brackets 168 before secondary cross arms 162 are attached to primary cross arms 156. This approach may be desired to be used, e.g., if receiving member 246 is permanently attached to reciprocating member 202.

As shown in FIG. 3, regardless of the manner in which reciprocating assembly 196 is installed, when fully inserted within mounting brackets 168, the bottom surface 208 of top portion 204 of reciprocating member 202 rests against inner surface 174 of each mounting bracket 168 while connecting portion 232 extends through each opening 184. By being mounted thusly, reciprocating assembly 196 is able to reciprocally move (i.e., move back and forth) within mounting brackets 168 along the central longitudinal axis 194. As such, when attached to a vehicle, the reciprocating motion of reciprocating assembly 196 is generally parallel to the windshield and generally perpendicular to the prescribed arcuate travel of the windshield wiper 100 across the windshield. Reciprocating member 202 and receiving member 246 can be comprised of metal, plastic, or other rigid material.

Returning to FIG. 4, scrubbing member 198 has a top surface 264 extending laterally between opposing sides 266 and 268. Extending down from top surface 264 at both sides 266 and 268 respectively, are a pair of scrubbing surfaces 270 and 272. Scrubbing surfaces 270 and 272 both extend down from top surface 264 and then curve toward each other until scrubbing surfaces 270 and 272 meet at the bottom, denoted as 274 in the depicted embodiment. As such, the scrubbing surfaces 270 and 272 together form a "U" shaped cross section. In some embodiments scrubbing surfaces 270 and 272 come together to form a ridge to form more of a "V" shaped cross section. In other embodiments portions of scrubbing surfaces 270 and 272 are flat so that scrubbing member 198 has a substantially flat bottom surface. Other shapes can also be used. In some embodiments, the width of scrubbing member 198 between sides 266 and 268 is between about 8 mm to about 50 mm, with between about 12 mm to about 25 mm being common. Other widths can also be used. In some embodiments, the width of scrubbing member 198 is substantially the same as the width of reciprocating assembly 196.

The top surface 264 and scrubbing surfaces 270 and 272 extend longitudinally from a first end face 276 to a spaced apart second end face 278. In some embodiments, the longitudinal length of scrubbing member 198 between first end face 276 and second end face 278 is between about 305 mm to about 700 mm, with between about 375 mm to about 640 mm being common. Other lengths can also be used. In some embodiments, the longitudinal length of scrubbing member 198 between first end face 276 and second end face 278 can be substantially the same as the longitudinal length of reciprocating assembly 196 between end faces 240 and 242.

Scrubbing member 198 can be comprised of one or more of: a foam pad, a chamois, a cloth, bristles or any other material that can scrub a windshield without scratching the glass. For example, in one embodiment, scrubbing member 198 is comprised of a high density foam. In addition, a mesh netting can be used to cover the scrubbing surfaces 270 and 272 if desired, as shown in the depicted embodiment.

Continuing with FIG. 4, scrubbing member 198 is attached to reciprocating member 202 in such a manner that scrubbing member 198 will reciprocally move with reciprocating member 202 to thereby scrub the glass as the windshield wiper 100 moves over the windshield. This is done by attaching the top surface 264 of scrubbing member 198 to the bottom surface 224 of bottom portion 220 of reciprocating member 202. In some embodiments scrubbing member 198 is permanently attached to reciprocating member 202, while in other embodiments scrubbing member 198 is attached so as to be removable. If permanent attachment is desired, adhesives such as glues, epoxies, or other types of adhesives can be used. Other known methods for permanent attachment can also be used.

If a removable attachment is desired, a means for removably attaching scrubbing member 198 to reciprocating assembly 196 can be used. For example, in the depicted embodiment, the means for removably attaching scrubbing member 198 to reciprocating assembly 196 comprises a hook and loop fastener 282, such as, e.g., a VELCRO type of fastener, as is known in the art. Hook and loop fastener 282 comprises matching strips 284 and 286.

Strip 284 is permanently adhered to the top surface 264 of scrubbing member 198 and matching strip 286 is permanently adhered to the bottom surface 224 of bottom portion 220 of reciprocating member 202. Strip 284 has a surface comprised of either the hook or the loop material, and strip 286 has a surface comprised of the mating loop or hook material, as is known in the art. As such, when the two strips 284 and 286 are pushed together, the hook and loop surfaces engage each other, causing the two strips to attach to each other and remain attached until pulled apart, as is known in the art. Because strips 284 and 286 are respectfully adhered to scrubbing member 198 and reciprocating member 202, scrubbing member 198 is thereby attached to reciprocating member 202 until the user pries the two members apart.

Alternatively, other types of fasteners, such as releasable adhesives, screws, releasable fasteners, pins, etc. can also be used as the means for removably attaching scrubbing member 198 to reciprocating assembly 196. Other means for removably attaching scrubbing member 198 to reciprocating member 202, as are known in the art, can also be used.

There are a number of reasons why scrubbing member 198 may need to be removed and replaced. Simple wear and tear that occurs over an extended period of use may necessitate periodic replacement. Or a user may have scrubbing members made of different materials for different uses so as to necessitate switching scrubbing members. For example, a user may have one scrubbing member for normal use and a scrubbing member made of a stiffer material for winter use or for off-road use. The user would then want to switch scrubbing members based on the desired use.

In light of the above, a removable attachment of scrubbing member 198 to reciprocating member 202 provides some unique benefits over a permanent attachment. For example, if scrubbing member 202 is removable, then scrubbing member 202 can simply be removed from reciprocating member 202 and replaced while reciprocating member 202 remains attached to scrubber support structure 140. When the attachment of scrubbing member 198 to reciprocating member 202 is permanent, however, reciprocating member 202 is also required to be removed from scrubber support structure 140 every time scrubbing member 198 is replaced. Furthermore, reciprocating member 202 also is required to be replaced with scrubbing member 198 if the attachment is permanent.

Returning to FIG. 2, motor 144 comprises a standard dc type electrical motor as is known in the art that is mounted to scrubber support structure 140. In some embodiments, motor 144 has a speed of between about 2,000 rpm to about 20,000 rpm, with between about 9,000 rpm to about 12,000 rpm being common. Other speeds can also be used. In the depicted embodiment, motor 144 is mounted to the center section 152 of scrubber support structure 140, although this is not required. Motor 144 can be mounted to scrubber support structure 140 by mounting screw, fastener, or other permanent or removable mounting means known in the art.

Figure 6:
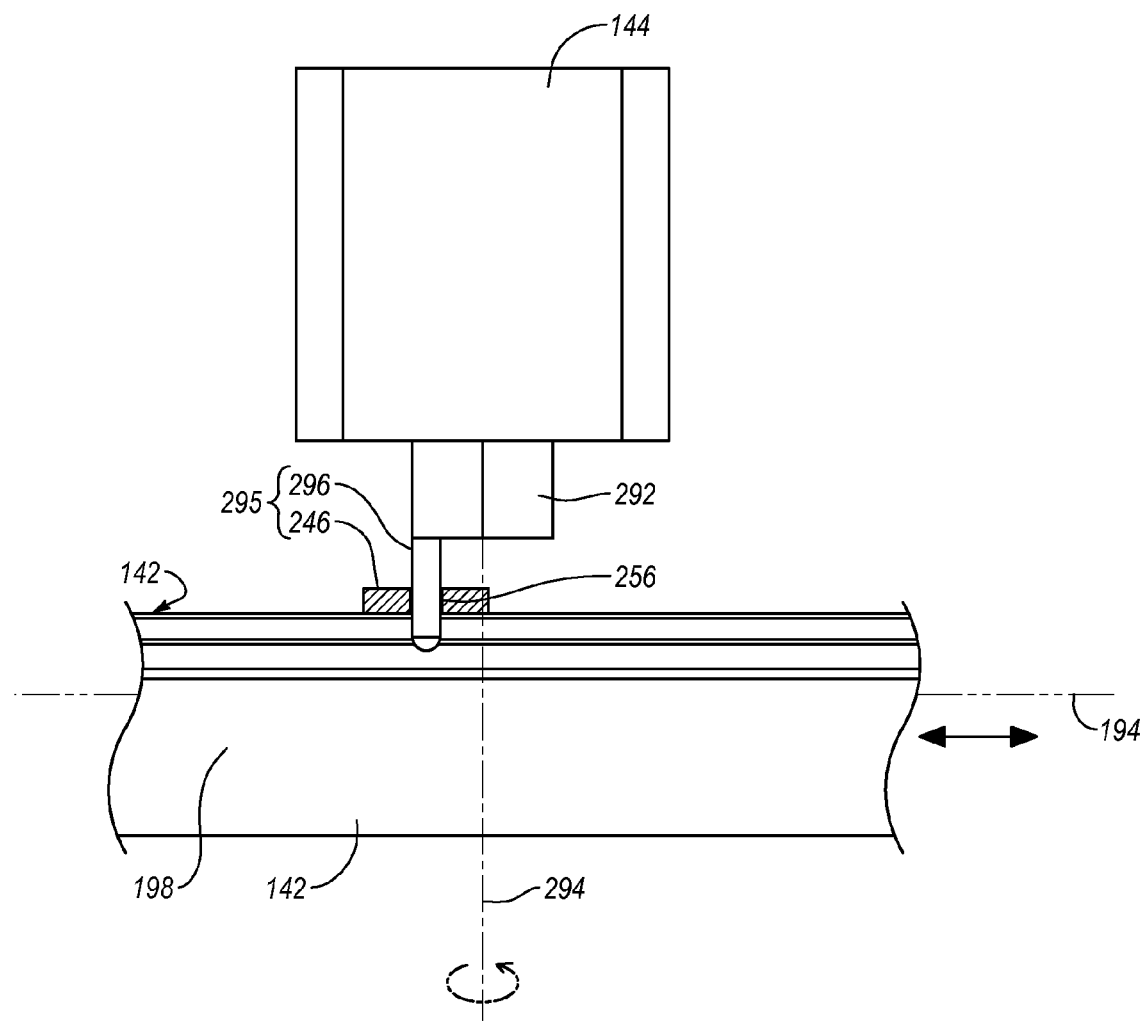
FIG. 6 is a front view of a motor engaged with the receiving member shown in FIG. 5.

Turning to FIG. 6, motor 144 has a shaft 292 extending therefrom that rotates about a rotational axis 294 when motor 144 is energized. Motor 144 is configured to be energized by the automobile battery or a portable power source, such as a battery pack, as discussed below.

Motor 144 is positioned on scrubber support structure 140 (see FIG. 2) so as to engage with scrubber element 142 and thereby reciprocally move scrubber element 142 along the central longitudinal axis 194. To do this, motor 144 is attached to scrubber element 142 through a linkage 295 which converts rotational motion of the motor shaft 292 to linear motion of the scrubber element 142. For example, in the depicted embodiment an attaching member 296 is secured to shaft 292 at a position offset from the rotational axis 294. The attaching member 296 can be attached to shaft 292 or can be integrally formed therewith. In the depicted embodiment, the attaching member 296 comprises a pin. Other types of attaching members can alternatively be used. Due to its offset from rotational axis 294, pin 296 travels in a circle around rotational axis 294 as shaft 292 is rotated.

In the depicted embodiment, motor 144 is positioned on scrubber support structure so that shaft 292 extends downward toward scrubber element 142 and pin 296 extends through aperture 256 of tab 246. By so doing, rotation of shaft 292 can cause reciprocating assembly 196 to reciprocally move along the central longitudinal axis 194 thereof as hereafter described with reference to FIGS. 7A-7D.

As described above, as shaft 292 rotates, pin 296 moves in a circle. As shown in FIGS. 7A-7D, this causes pin 296 to move back and forth between first and second ends 258 and 260 of aperture 256 while tab 246 moves laterally back and forth along the longitudinal axis 194.

Figure 7A:
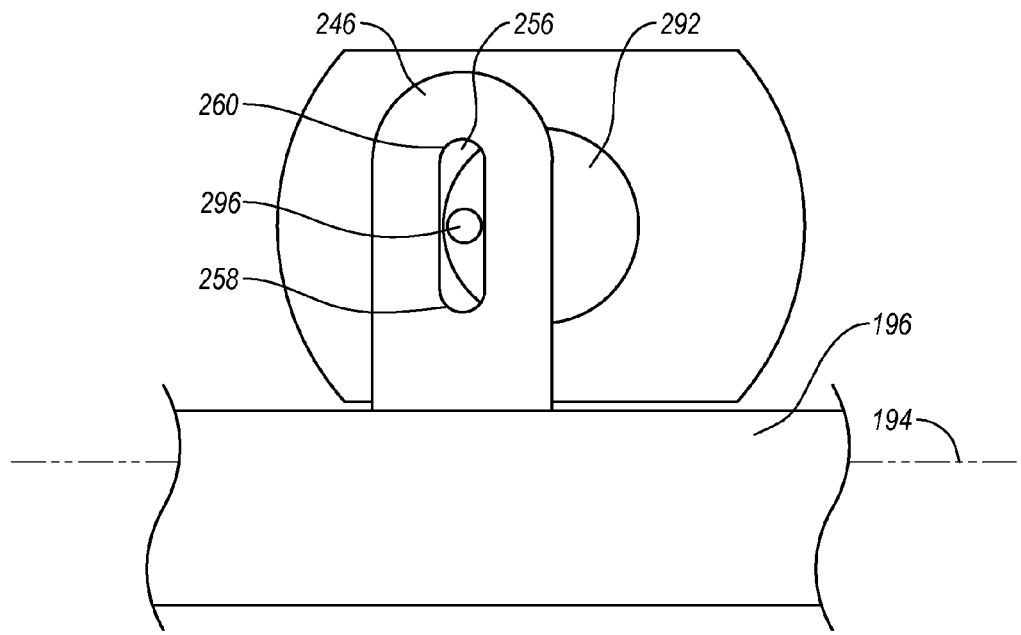
FIGS. 7A-7D are bottom views showing how the reciprocating assembly reciprocally moves as a direct result of the rotary movement of the shaft of the motor.

In FIG. 7A, shaft 292 is positioned so that pin 296 is at its leftmost position on the shaft. In this position, pin 296 is disposed about midway between first and second ends 258 and 260 of aperture 256 and tab 246 is in its leftmost position.

Figure 7B:
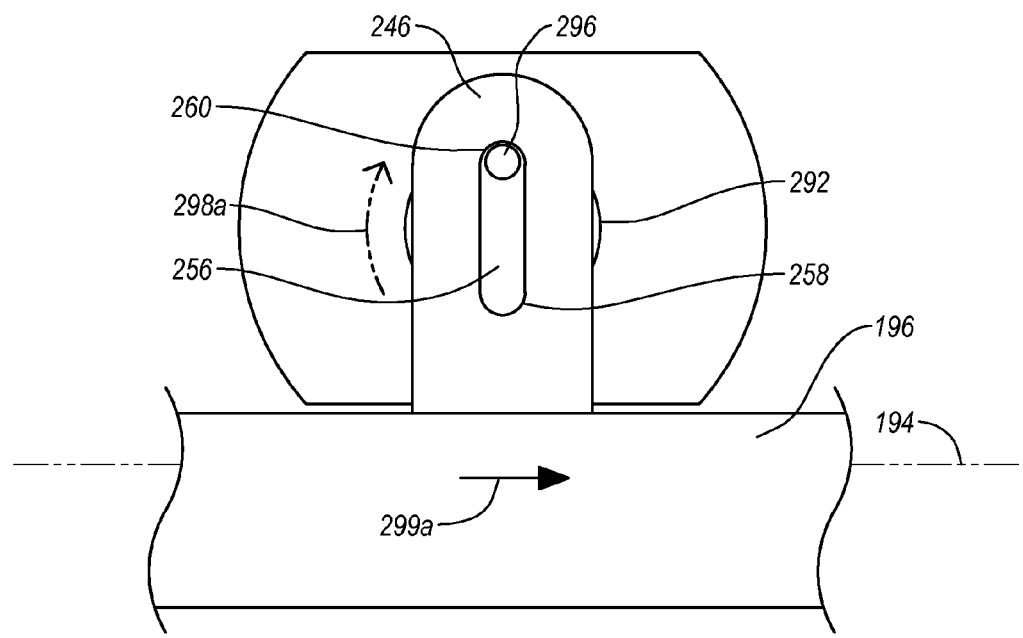

As shaft 292 rotates clockwise 90 degrees, as denoted by arrow 298a, pin 296 moves to the position shown in FIG. 7B. As a result of the rotation of shaft 292, pin 296 has now moved to the second end 260 of aperture 256 and tab 246 has moved to the right with respect to its position in FIG. 7A. Because tab 246 is attached to reciprocating assembly 196, reciprocating assembly 196 also moves to the right, as denoted by arrow 299a.

Figure 7C:
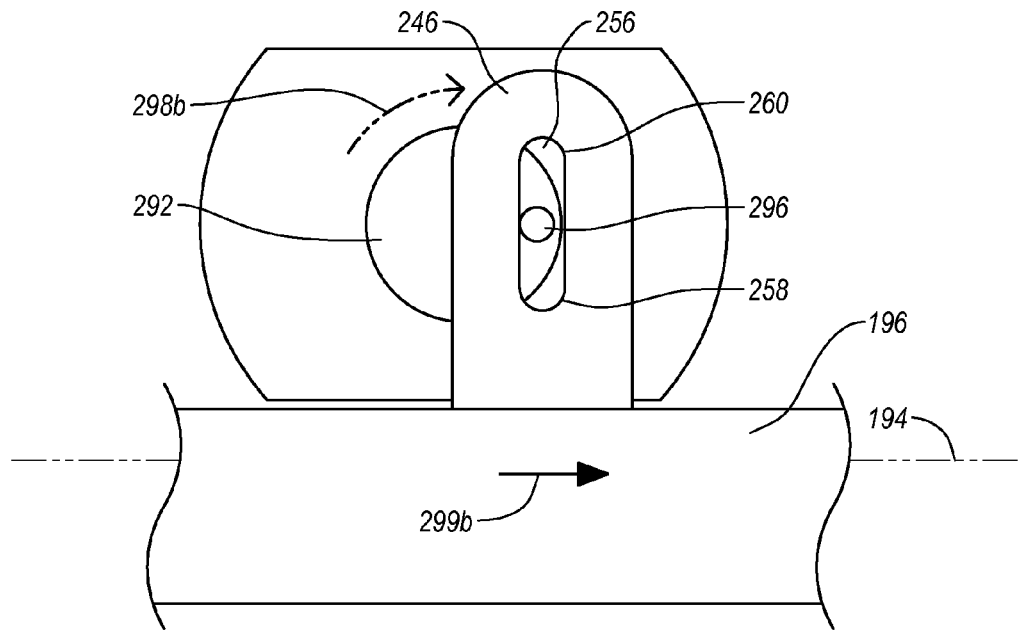

As shaft 292 further rotates clockwise another 90 degrees as denoted by arrow 298b, pin 296 moves to the position shown in FIG. 7C. In this position, pin 296 has now moved back to the middle of aperture 256 and tab 246 has moved further to the right, to its rightmost position. Again, because pin 246 is attached to reciprocating assembly 196, reciprocating assembly 196 also moves to the right, as denoted by arrow 299b.

Figure 7D:
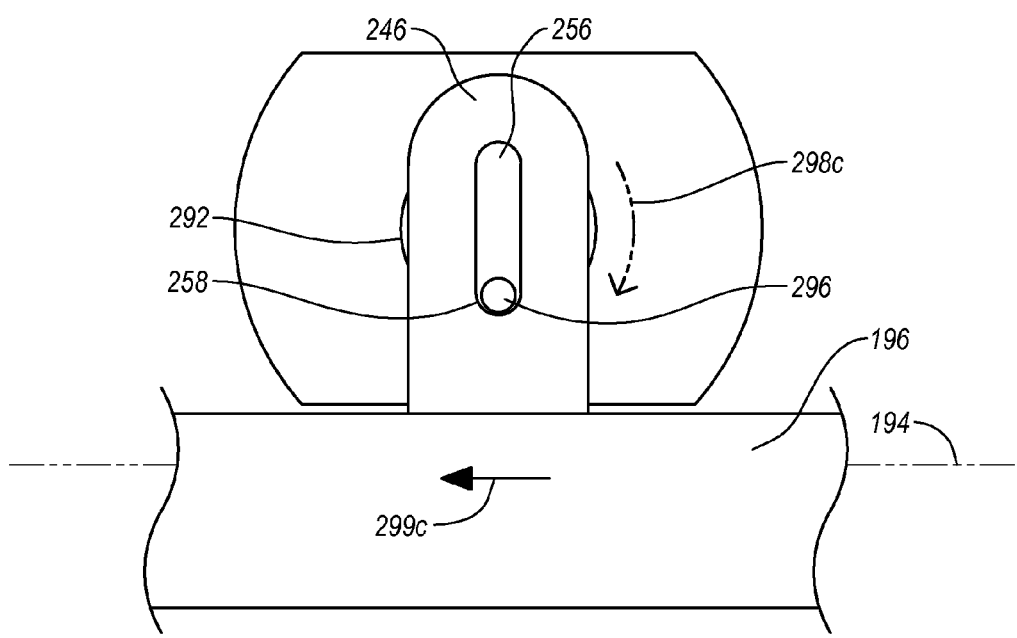

As shaft 292 further rotates clockwise another 90 degrees as denoted by arrow 298c, pin 296 moves to the position shown in FIG. 7D. In this position, pin 296 has now moved to the other (i.e., first) end 258 of aperture 256 and tab 246 has started to move back to the left. Reciprocating assembly 196 has also moved to the left, accordingly, as denoted by arrow 299c.

Finally, as shaft 292 further rotates clockwise another 90 degrees, pin 296 and tab 246 return to the position shown in FIG. 7A and the process then repeats itself. Thus, because of the continuous rotation of shaft 292, the engagement of pin 296 and tab 246 causes reciprocating assembly 196 to be reciprocally moved along central longitudinal axis. And due to its attachment to reciprocating assembly 196, scrubber element 142 (see FIG. 6) is also reciprocally moved along central longitudinal axis 194.

Although shaft 292 is discussed above as rotating in a clockwise direction, it is appreciated that shaft 292 can alternatively rotate in a counterclockwise direction, which will also result in reciprocating assembly 196 reciprocally moving along the central longitudinal axis. In addition, although the depicted embodiment shows tab 246 extending laterally from reciprocating member 202, it is appreciated that tab 246 can alternatively be positioned so as to not extend laterally (see, e.g., tab 352 of FIG. 9). Furthermore, the embodiment described above using pin 296 as the attaching member and tab 246 as the receiving member is only one example of a linkage that can be used with the present invention. Other linkages are also possible.

Figure 8:
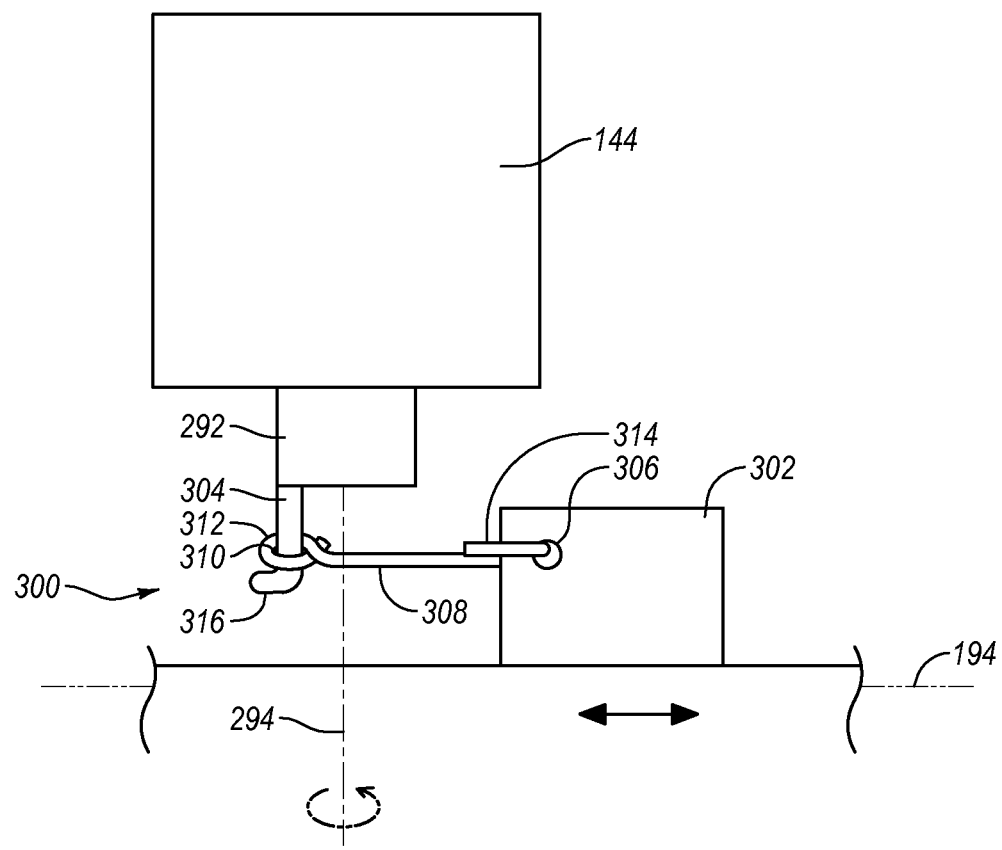
FIG. 8 is a front view of a portion of a scrubber assembly showing an alternative embodiment of a linkage.

For example, FIG. 8 depicts an alternative embodiment of a linkage 300 having a tab 302 and a pin 304 that can be used with the present invention. Tab 302 is similar to tab 246 in many respects. For example, similar to tab 246, tab 302 is attached to reciprocating assembly 196 and has an aperture 306 formed therein. However, instead of being substantially horizontal, as tab 246 is, tab 302 is substantially vertical. Similarly, pin 304 is similar to pin 296 in many respects. For example, similar to pin 296, pin 304 is positioned on shaft 292 so as to be offset from rotational axis 294. Unlike in linkage 295 discussed previously, however, pin 304 is not directly received within aperture 306 formed on tab 302. Instead, linkage 300 includes a link 308 that connects pin 304 to tab 302.

Link 308 is comprised of a wire or the like extending between a first end 312 and a spaced apart second end 314. Link 308 is looped at first end 312 so as to bound an aperture 310. Pin 304 is inserted through aperture 310. Unlike pin 296, pin 304 is bent at the end 316 furthest from shaft 292 so that pin 304 will remain within aperture 310. The other end 314 of link 308 is inserted through aperture 306 formed in tab 302. Link 308 is further bent at second end 314 to help keep link 308 disposed within aperture 306.

As shaft 292 rotates, the first end 312 of link 308 moves in a circular pattern with pin 304, which causes the second end 314 of link 308, which is attached to tab 302, to reciprocate in the longitudinal direction 194. Because of its attachment to tab 302, reciprocating assembly 196 is thus caused to reciprocally move along central longitudinal axis 194.

Figure 9:
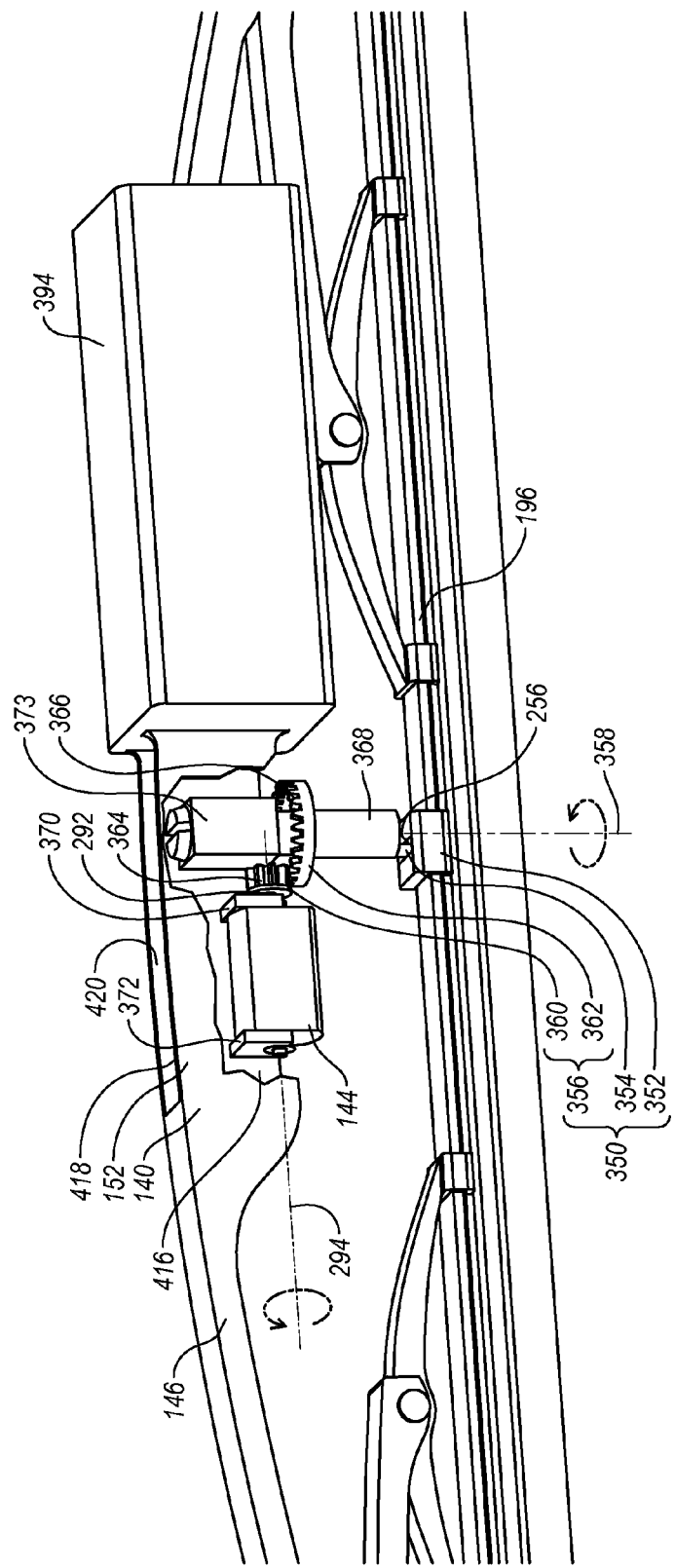
FIG. 9 is a front perspective view of a portion of an alternative embodiment of a scrubber assembly showing another alternative embodiment of a linkage.

FIG. 9 depicts another embodiment of a linkage 350 that can be used in the present invention. Linkage 350 is designed so that motor 144 can be mounted such that rotational axis 294 is substantially parallel to central longitudinal axis 194 (FIG. 2). Similar to linkage 295, linkage 350 has a tab 352 and a pin 354. However, instead of being directly secured to shaft 292, pin 354 is indirectly coupled to shaft 292 through a gearing system 356. Gearing system 356 is designed to convert the rotation of shaft 292 of motor 144 about rotational axis 294 into rotation about a rotational axis 358 that is perpendicular to rotational axis 294. To accomplish this, gearing system 356 comprises a first gear 360 attached to or integrally formed with shaft 292 of motor 144, and a second gear 362 to which pin 354 is attached.

First gear 360 is circularly shaped with gear teeth 364 positioned about the perimeter thereof. First gear 360 is directly mounted onto shaft 292 so as to rotate about rotational axis 294. Alternatively, first gear 360 can be integrally formed on shaft 292. Second gear 362 is also circularly shaped with gear teeth 366 positioned about the perimeter thereof. Gear teeth 366 are configured to mate with gear teeth 364, as shown in the depicted embodiment. Second gear 362 is mounted onto scrubber support structure 140 so that second gear 362 can rotate about rotational axis 358, which is orthogonal to rotational axis 294. Pin 354 is secured to second gear 362, either directly or through a mounting member 368, as shown in the depicted embodiment. Pin 354 is positioned so as to extend in the same direction as rotational axis 358, but to be offset from the rotational axis 358.

First and second gears 360 and 362 are positioned so that the teeth 364 and 366 enmesh. As such, as shaft 292 rotates about rotational axis 294, first gear 360 also rotates about rotational axis 294. This causes second gear 362 to rotate about rotational axis 358 due to the engaging teeth 364 and 366. The gear ratio between first and second gears 362 and 364 can be adapted as desired. In one embodiment, a gear ratio of about 4:1 was used. Other gear ratios can also be used. Due to its offset from rotational axis 358, pin 354 travels in a circle around rotational axis 358 as second gear 362 rotates. Pin 354 engages tab 352 to cause reciprocating motion in a manner similar to that discussed previously with regard to pin 296 and tab 246.

Because gearing system 356 converts rotational motion between perpendicular axes 294 and 358, motor 144 is positioned so that shaft 292 extends therefrom in a direction that is substantially parallel to reciprocating assembly 196. As a result, many of the components of the motor 440 and linkage 350 can be positioned directly above reciprocating assembly 196. For example, as shown in the depicted embodiment, aperture 256 of tab 352 can be aligned directly above reciprocating assembly 196. As a result, tab 352 can be substantially flush with the sides of reciprocating assembly 196, as in the depicted embodiment.

Furthermore, as a result of the vertical alignment motor 144 can be positioned within the framework of scrubber support structure 140, if desired. For example, in the depicted embodiment a pair of attachment members 370 and 372 secures motor 144 within channel 420 formed by center section 152 of main cross member 146. Attachment members 370 and 372 each attaches to motor 144 and to side walls 416 and 418 of main cross member 146. In this manner, motor 144 is at least partially positioned and mounted within channel 420. Support structure 373 of the second gear 362 can also be mounted within channel 420, if desired, as shown in the depicted embodiment.

Other types of linkages that convert rotary to reciprocating motion can alternatively be used. Furthermore, gearing can also be used in other embodiments, including those described previously, to change the ratio of rotational motion to reciprocating motion, if desired.

As noted above, various motor speeds can be used ranging from about 2,000 rpm to about 20,000 rpm. If the attaching member is secured directly to the shaft of the motor, the reciprocating frequency of the reciprocating assembly will generally match the rotary speed. That is, if the motor speed is, e.g., about 3,000 rpm, then the reciprocating frequency will be about 3,000 cycles/minute or about 50 cycles per second (Hz). Of course, if gearing is used, then the reciprocating frequency is determined by the gear ratio, as is known in the art. In various embodiments, the reciprocating frequency of reciprocating assembly 196 can range between about 20 Hz to about 200 Hz with about 30 Hz to about 50 Hz being common. Other reciprocating frequencies can also be used.

Figure 10:
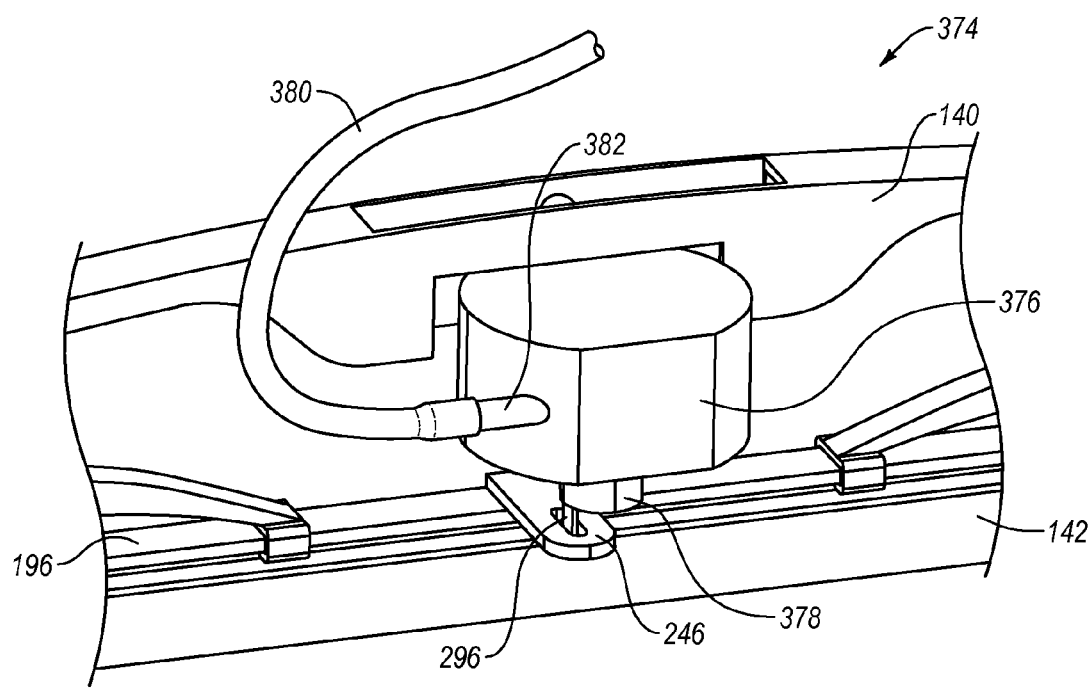
FIG. 10 is a perspective view of a portion of an alternative embodiment of a scrubber assembly that incorporates a turbine instead of a motor.

In an alternative embodiment, a turbine is used in place of motor 144 to provide the rotational motion to attaching member 296. For example, FIG. 10 depicts an alternative embodiment of a scrubber assembly 374 in which a turbine 376 is used instead of motor 144. Similar to motor 144, turbine 376 includes a shaft 378 to which attaching member 296 is secured. However, instead of using battery power to activate motor 144 to rotate the shaft, turbine 376 uses the automobile's pressurized windshield washer fluid line 380 to provide the force necessary to rotate shaft 378. Turbine 376 includes an input port 382 to which the pressurized windshield washer line 380 is fluidly connected. Due to the pressure of the windshield washer fluid, the turbine shaft 378 rotates when the windshield washer signal is activated from inside the vehicle, thereby causing the reciprocating assembly 196 to correspondingly reciprocally move, as discussed above. By way of example only, U.S. patent application Ser. No. 12/248,732 filed on Oct. 9, 2008, which is incorporated herein by reference in its entirety, contains examples of different types of turbines that can be used in the present invention, adapted as needed. It is appreciated that turbine 376 can also be used in place of motor 144 in the arrangement using linkage 350 shown in FIG. 9.

Figure 11:
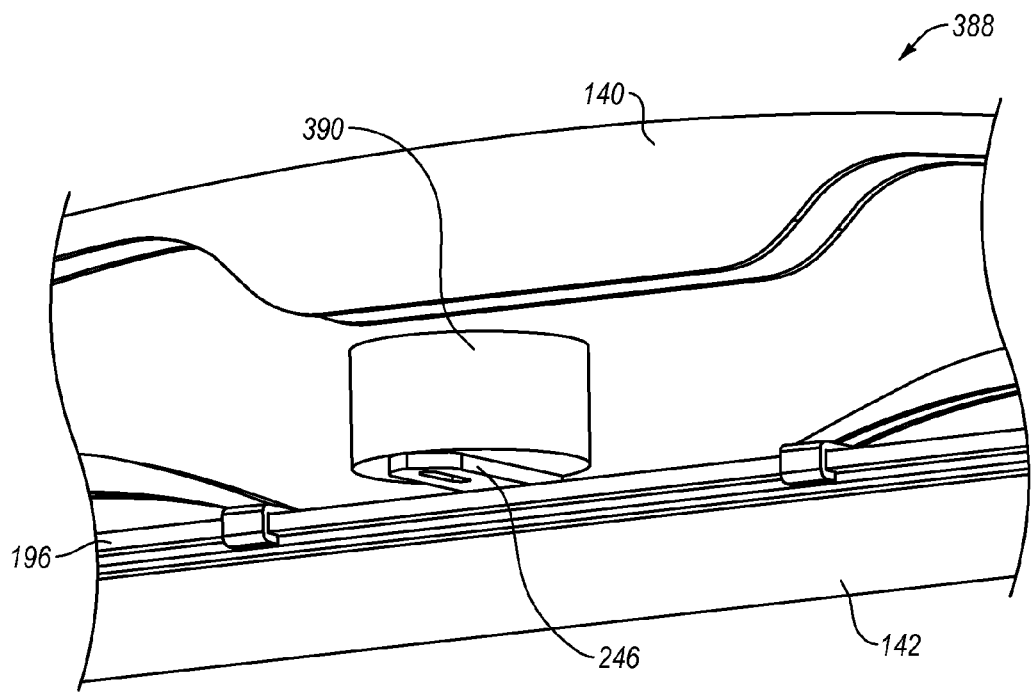
FIG. 11 is a perspective view of a portion of an alternative embodiment of a scrubber assembly that incorporates a vibrating motor.

In some embodiments, the scrubbing motion produced is a non-reciprocating motion. For example, FIG. 11 depicts another alternative embodiment of a scrubber assembly 388 that causes the reciprocating assembly to vibrate instead of reciprocate to help clean the windshield. To accomplish this, a vibrating motor 390 is used instead of conventional rotary shaft motor 144. Instead of being secured to scrubber support structure 140 and being indirectly coupled to reciprocating assembly 196 as in previously described embodiments, vibrating motor 390 is secured rigidly to reciprocating assembly 196 (which will also be referred to herein as vibrating assembly 196 when vibrating motor 390 is used). This can be done by rigidly attaching vibrating motor 390 directly to vibrating assembly 196, or to receiving member 246, as in the depicted embodiment. In light of this, when vibrating motor 390 is activated so as to vibrate, vibrating assembly 196 correspondingly vibrates due to its rigid attachment to vibrating motor 390.

Figure 12:
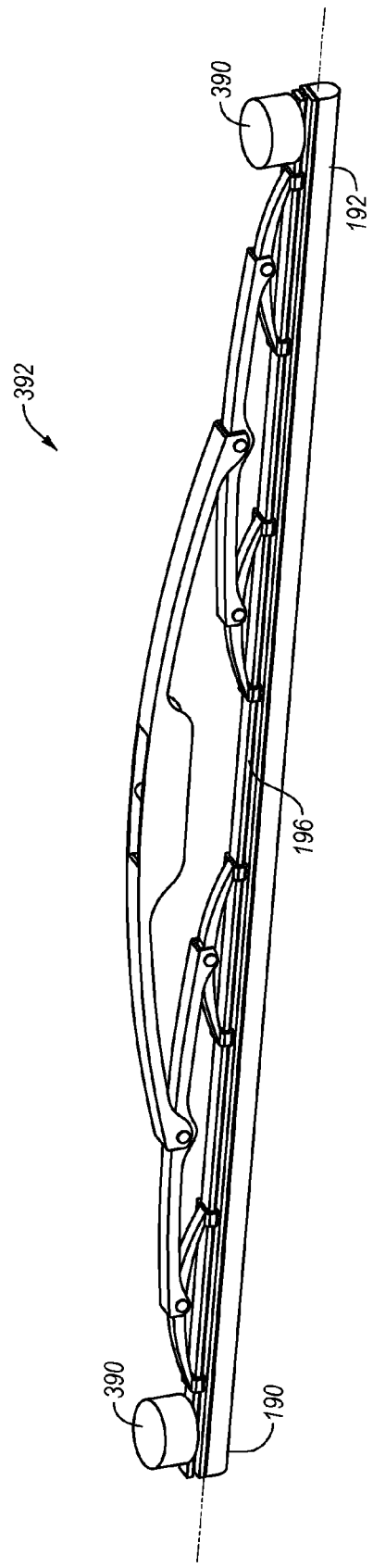
FIG. 12 is a front perspective view of a scrubber assembly that incorporates a plurality of vibrating motors.

Vibrating motor 390 can be made from a conventional motor by simply adding an offset weight to the shaft thereof. Alternatively, many commercially available vibrating motors can be used in the present invention. Various vibrating frequencies can be used. In some embodiments, vibrating frequencies within the ultrasonic range (i.e., above 22 kHz) are used. Furthermore, vibrating motor 390 can be positioned anywhere along vibrating assembly 196. For example, in one embodiment vibrating motor 390 is positioned at or near first end 190 while in another embodiment, vibrating motor 390 is positioned at or near second end 192. If desired, one or more additional vibrating motors 390 can also be used. For example, FIG. 12 depicts one embodiment of a scrubber assembly 392 in which a pair of vibrating motors 390 is used, the vibrating motors 390 being positioned at opposite ends 190 and 192 of vibrating assembly 196. Other configurations are also possible.

In addition, one or more vibrating motors 390 can be used in conjunction with any of the embodiments discussed previously that use motor 144 or turbine 376. For example, one or more vibrating motors 390 can be positioned at or near first or second ends 190, 192, while motor 144 or turbine 376 is positioned near the center of reciprocating/vibrating assembly 196. By so doing, scrubbing member 198 uses both a reciprocating motion and a vibrating motion to clean the windshield as scrubbing member 198 passes over the windshield.

In some embodiments, motor 144 is electrically connected to the battery of the automobile to which the windshield wiper 100 is attached. In those embodiments, wires are strung from the battery or other electrical terminal on the automobile to the motor 144 through the wiper arm 106. It is noted that all electrical wiring has been omitted from the drawings herein for clarity sake. In other embodiments, a power source other than the automobile battery is used.

For example, in the embodiment shown in FIG. 1, scrubber assembly 102 further comprises a portable power source 324 that provides power to the motor 144 through appropriate wiring or cabling. The portable power source 324 comprises a battery pack mounted to the scrubber support structure 140. Battery pack 324 can be positioned anywhere on scrubber support structure 140. Battery pack 324 is configured to hold one or more batteries. Embodiments of the invention can be powered by conventional batteries, such as AAA, AA, C, D, or 9-volt batteries. Accordingly, any type of battery pack 324 that houses those type of batteries can be used. Furthermore, battery pack 324 can include 1 or more batteries connected in series or in parallel, as is known in the art. Other types of batteries, such as watch-type or other batteries and corresponding battery packs 324 can also be used. Of course, if a turbine is used in place of motor 144 (see FIG. 10), the battery pack and accompanying wiring can be omitted.

In one embodiment, the battery pack is integrally formed with scrubber support structure 140. For example, FIG. 9 depicts an embodiment of a battery pack 394 that is integrally molded with main cross-member 146. Battery pack 394 is sized to hold a 9-volt battery. Of course it is appreciated that battery pack 394 can alternatively be sized to hold any of the other battery types discussed above.

A number of different means are available to turn motor 144 on and off so as to engage scrubber element 142. For example, a manual toggle switch, as is known in the art, can be electrically connected between battery pack 324 and motor 144 to activate the motor. The switch can be positioned on the dashboard or other location on the inside of the automobile.

Figure 13:
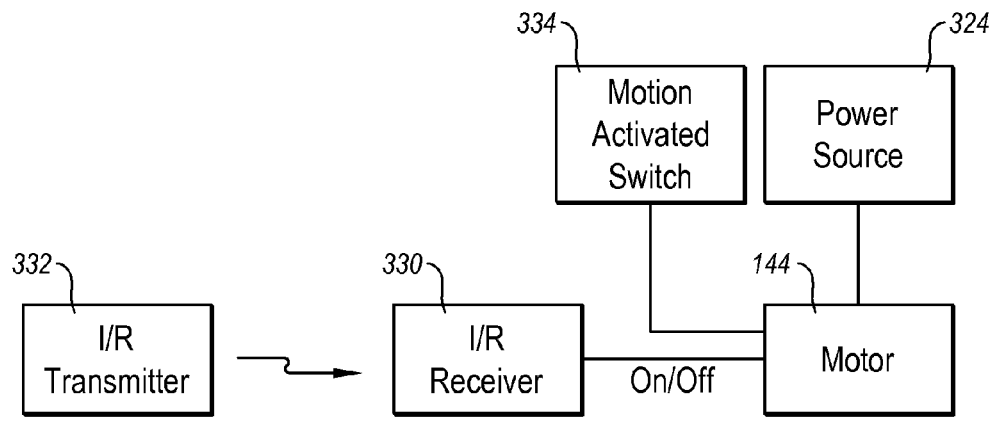
FIG. 13 is a schematic view of a remote apparatus for turning the scrubbing assembly motor on and off according to one embodiment.

In some embodiments, a remote switch can be used in place of a manual toggle switch. This allows the motor 144 to be activated wirelessly. Turning to FIG. 13, in these embodiments a wireless receiver 330, as is known in the art, is attached to scrubber support structure 140 and electrically connected to the motor 144. A corresponding wireless transmitter 332 is positioned within the automobile, either attached to the automobile, or freely movable therein. When the user desires to activate motor 144, a button on wireless transmitter 332 is pushed or otherwise toggled, which causes wireless transmitter 332 to wirelessly send an "on" signal to wireless receiver 330, as is known in the art. Wireless receiver 330 then activates motor 144, causing the scrubber element 142 to reciprocally move, as discussed above. When the user pushes or toggles the same or another button, wireless transmitter 332 wirelessly sends an "off" signal to wireless receiver 330, as is known in the art. This causes motor 144 to turn off, and scrubber element 142 stops reciprocating. Wireless transmitter 332 and receiver 330 can use a matching infrared, digital, analog, or other type of wireless link, as is known in the art. Additionally, the signal can be encoded or not, as is also known in the art.

In addition to the manual activation switches discussed above, in some embodiments the motor can be automatically activated by the motion or position of the windshield wiper. For example, a motion-activated switch 334, as is known in the art, can be attached to scrubber support structure 140 so motor 144 will activate only when windshield wiper 100 is moving in its normal arc across the windshield. As another example, a gravity switch or mercury-type switch, as is known in the art, can be attached to scrubber support structure 140 so motor 144 will activate only when windshield wiper 100 is at a pre-determined angle. Using these types of automatic switches, the motor 144 will be engaged when windshield wiper 100 is moving across the windshield. Then, when windshield wiper 100 has stopped moving and is positioned in its resting state, the motor 144 is not engaged. This saves battery life as well as wear and tear on the scrubbing member 198.

It is appreciated that the motion type switches can be used either exclusively or in conjunction with the manual or wireless switch positioned in the automobile. In such a system, the manual or wireless switch can be used to turn the system on, after which a motion activated switch, as discussed above, activates motor 144 when motion of the windshield wiper 100 is detected.

Windshield wiper 100 further includes means for attaching scrubber assembly 102 to wiper assembly 104. The means for attaching scrubber assembly 102 to wiper assembly 104 can include screws, adhesives, fasteners, or any other means known in the art. The means for attaching can attach scrubber assembly 102 to wiper assembly 104 at multiple points between the two assemblies, or at a single point. In some embodiments, as noted above, an adapter or connector can be used as a means for attaching scrubber support structure 140 to wiper support structure 108 and to wiper arm 106.

For example, returning to FIG. 2, a wiper arm connector 450 is used as the means for attaching scrubber support structure 140 to wiper support structure 108 as well as the means for removably attaching the windshield wiper 100 to wiper arm 106. Wiper arm connector 450 is substantially rigid in its attachment to both scrubber support structure 140 and wiper support structure 108, which results in a substantially rigid connection.

Figure 14:
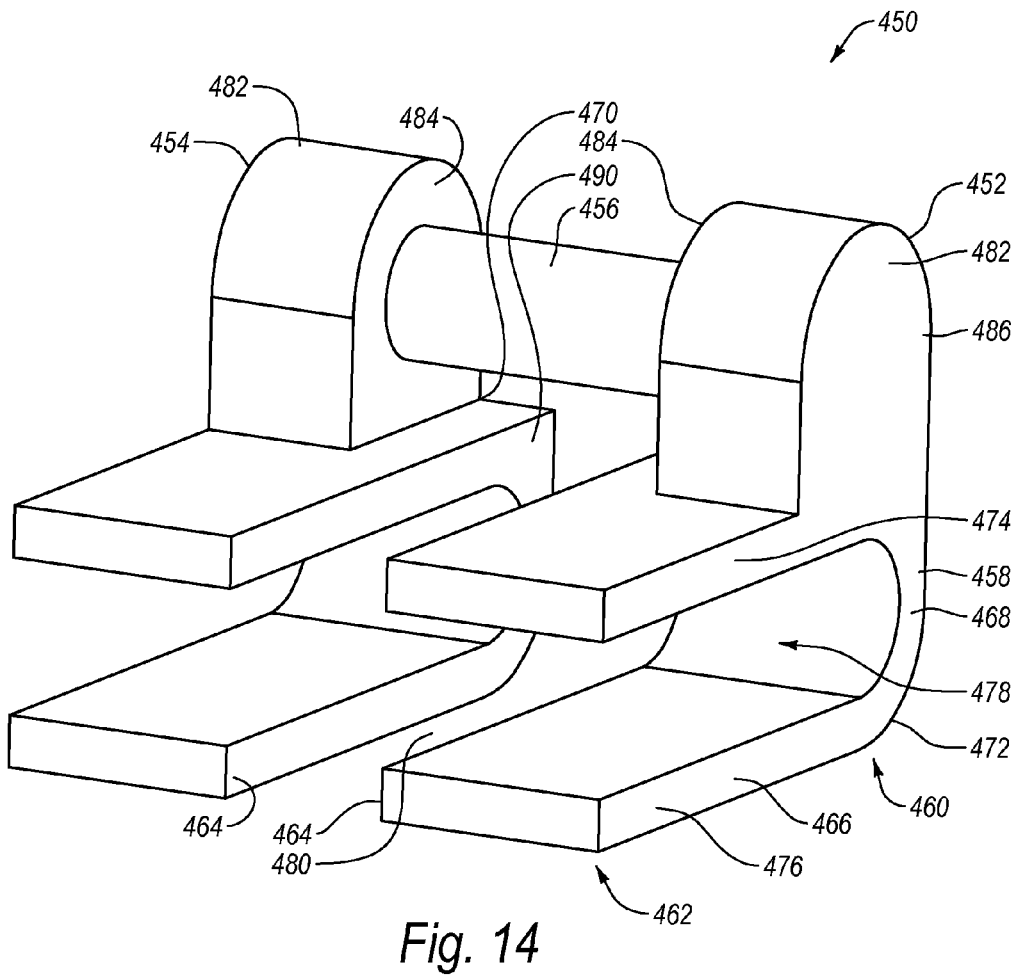
FIG. 14 is a perspective view of the wiper arm connector shown in FIG. 2.

Turning to FIG. 14, wiper arm connector 450 comprises a first attachment member 452 and a second attachment member 454 connected by a cross member 456. First attachment member 452 is configured to attach to wiper support structure 108 and second attachment member 454 is configured to attach to scrubber support structure 140. First and second attachment members 452 and 454 are substantially mirror images of each other. As such, only a discussion of the structure of first attachment member 452 will be set forth herein; the structure of second attachment member 454 will simply be a mirror image of the structure of first attachment member 452.

First attachment member 452 comprises a main body 458 extending longitudinally between a first end 460 and a spaced apart second end 462 and laterally between an inside surface 464 and an outside surface 466. Main body 458 includes a back wall 468 disposed at first end 460, and extending between a top edge 470 and a bottom edge 472. A top wall 474 and a bottom wall 476 respectfully extend longitudinally from top and bottom edges 470 and 472 of back wall 468 to second end 462. Top and bottom walls 474 and 476 are substantially parallel to each other, although this is not required. Top wall 474, bottom wall 476, and back wall 468 together bound a U-shaped channel 478 extending laterally completely through main body 458 between inside and outside surfaces 464 and 466. An open mouth 480 of the "U" is disposed at second end 462. Extending up from top wall 474 of main body 458 near first end 460 is a tab 482 having an inside surface 484 and an opposing outside surface 486. As noted above, second attachment member 454 has substantially the same structure as first attachment member 452, but in mirror image.

First and second attachment members 452 and 454 are positioned such that the inside surfaces 464 and 484 of main body 458 and tabs 482 of first attachment member 452 faces the corresponding inside surfaces 464 and 484 of main body 458 and tabs 482 of second attachment member 454, as shown in FIG. 14. Cylindrical cross member 456 extends between inside surfaces 484 of tabs 482 of tabs 482 of both attachment members 452 and 454 so as to form a gap 490 between first and second attachment members 452 and 454.

Wiper arm connector 450 is typically made of a hard plastic or polymeric material and can be injection molded, if desired. Other substantially rigid materials and methods of manufacture can also be used.

As shown in FIG. 3, wiper arm connector 450 is positioned so that first attachment member 452 is disposed within channel 406 of main cross member 112 of wiper support structure 108 and second attachment member 454 is disposed within channel 420 of main cross member 146 of scrubber support structure 140. Specifically, wiper arm connector 450 is positioned so that cross members 410 and 424 are respectively received within channels 406 and 420. When in this position, wiper arm connector 450 provides a single point connection between wiper support structure 108 and scrubber support structure 140. Also while in this position, wiper arm 106 (FIG. 1) is able to attach to cross member 488 and thereby couple windshield wiper 100 to wiper arm 106. Wiper arm connector 450 can also be detached from either or both of the support structures as well as wiper arm 106. It is appreciated that in some embodiments, wiper arm connector 450 can be rotated 180 degrees before installing so that first and second attachment members 452 and 454 can be received within the opposite channels 406 or 420.

A windshield wiper 100 according to the present invention can be used to replace a standard windshield wiper that is currently on a vehicle. To do this, the old windshield wiper is removed from wiper arm 106 in the standard manner. The new windshield wiper 100 containing wiper assembly 104 and scrubber assembly 102 is then installed using wiper arm connector 450 as described above to attach windshield wiper 100 to wiper arm 106. Alternatively, instead of replacing the entire standard windshield wiper, scrubber assembly 102 can simply be attached to the existing windshield wiper. This can be done e.g., by screw, fastener, or other fastening device, or by using a detachable wiper arm connector such as connector 450. As discussed above, if a portable power source 324 is used, the power source 324 can already be secured to scrubber assembly 102 so that the electrical connections to motor 144 are already in place before scrubber assembly 102 is installed. In these embodiments, no other electrical or mechanical connections to the automobile or existing windshield wiper may be required. This can save a lot of time and effort for the person installing the scrubber assembly 102.

Once installed, windshield wiper 100 can be operated similar to a standard wiper. The vehicle operator uses the wiper controls to move the wiper back and forth across the windshield in the normal manner. When the operator desires to activate the scrubbing action of the scrubber member 198, the operator switches the system on by using a manual or wireless switch, as discussed above. If automatic switches, such as those described previously, are used, the motor 144 will then become activated upon movement across the windshield. This causes the scrubbing member 198 to reciprocally move as the windshield wiper 100 arcs across the windshield, thus providing the reciprocating scrubbing action.

Although the most obvious application of the windshield wiper and scrubber assemblies described herein is the personal automobile, other applications are also available. For example, the windshield wiper and scrubber assemblies described herein can also be used in commercial vehicles, such as trucking, construction, and farm vehicles; military and other government vehicles; aviation vehicles, such as commercial and private aircraft and support vehicles; trains; boats; and any other vehicle which incorporates a wiper to clean a windshield through which an operator or passenger views. Other uses may also be possible.

The invention as described herein provides many benefits to a vehicle operator. Embodiments of the windshield wiper as described herein can easily replace an existing windshield wiper on the vehicle or the scrubber assembly can simply be added to the existing windshield wiper with minimum installation effort. Little, if any, electrical wiring changes are needed and the scrubbing mechanism of the inventive wiper can be activated simply by motion of the windshield wiper. The scrubbing member is easily replaceable, as are the batteries needed to operate the motor.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A scrubber assembly comprising:
a scrubber support structure configured to attach to a windshield wiper, the scrubber support structure comprising:
a main cross member extending longitudinally between a first end and a second end;
a first primary cross arm extending longitudinally between opposing ends thereof, the first primary cross arm being pivotally attached to the first end of the main cross member at an attachment position of the first primary cross arm that is between the opposing ends of the first primary cross arm; and
a second primary cross arm extending longitudinally between opposing ends thereof, the second primary cross arm being pivotally attached to the second end of the main cross member at an attachment position of the second primary cross arm that is between the opposing ends of the second primary cross arm;
an elongated scrubber element movably coupled to the first and second primary cross arms, the scrubber element having a central longitudinal axis extending in the elongate direction between a first end and a spaced apart second end; and
a motor mounted to the scrubber support structure, the motor engaged with the scrubber element to reciprocally move the scrubber element along the central longitudinal axis.

2. The scrubber assembly recited in claim 1, further comprising a portable power source that provides power to the motor.

3. The scrubber assembly recited in claim 2, wherein the portable power source comprises a battery pack mounted to the scrubber support structure.

4. The scrubber assembly recited in claim 1, wherein the motor is attached to the scrubber element through a linkage which converts rotational motion of the motor to linear motion of the scrubber element.

5. The scrubber assembly recited in claim 4, wherein
the motor comprises a shaft that rotates about a rotational axis, and
the linkage comprises:
an attaching member secured to the shaft so as to be offset from the rotational axis; and
a receiving member secured to the scrubber element, the attaching member being engaged with the receiving member so as to cause the scrubber element to reciprocally move along the central longitudinal axis thereof when the shaft is rotated about the rotational axis.

6. The scrubber assembly recited in claim 5, wherein the attaching member comprises a pin; and the receiving member bounds an aperture, the pin being received within the aperture.

7. The scrubber assembly recited in claim 1, wherein the elongated scrubber element comprises:
an elongated reciprocating assembly coupled to the first and second primary cross arms;
a scrubbing member; and
means for removably attaching the scrubbing member to the reciprocating assembly, wherein the motor engages the reciprocating assembly so as to cause the scrubber element to reciprocally move along the central longitudinal axis.

8. The scrubber assembly recited in claim 7, wherein the scrubbing member comprises at least one of a foam pad, a mesh netting, a chamois, and a cloth.

9. The scrubber assembly recited in claim 7, wherein the means for removably attaching the scrubbing member to the reciprocating assembly comprises a hook and loop fastener.

10. The scrubber assembly recited in claim 7, wherein
the reciprocating assembly comprises:
an elongated reciprocating member; and
a receiving member projecting from the reciprocating member in a direction orthogonal to the central longitudinal axis, the receiving member including an aperture that extends therethrough, and
the motor comprises:
a shaft that rotates about a rotational axis, and
an attaching member secured to the shaft so as to be offset from the rotational axis, the attaching member being inserted into the aperture of the receiving member so as to cause the reciprocating assembly to reciprocally move along the central longitudinal axis thereof when the shaft is rotated about the rotational axis.

11. The scrubber assembly recited in claim 1, further comprising a remote apparatus that turns the motor on and off wirelessly.

12. The scrubber assembly recited in claim 1, further comprising a connector attached to the scrubber support structure, the connector being configured to attach to a windshield wiper.

13. The scrubber assembly recited in claim 12, wherein the connector is also configured to attach to a wiper arm of a vehicle.

14. The scrubber assembly recited in claim 1, wherein the scrubber element has a length between the first and second ends of between about 305 mm to about 700 mm and a width between about 8 mm to about 50 mm.

15. A windshield wiper comprising:
a wiper assembly comprising:
a wiper support structure comprising a plurality of cross arms extending longitudinally between a first end and a second end, each cross arm having a mounting bracket positioned at each end thereof so that the mounting brackets are longitudinally aligned with each other; and
a wiper blade attached to the mounting brackets of the wiper support structure; and
a scrubber assembly as recited in claim 1, the scrubber assembly being attached to the wiper assembly.

16. The windshield wiper recited in claim 15, wherein the scrubber assembly is detachable from the wiper support structure.

17. The windshield wiper recited in claim 15, further comprising a connector that attaches the scrubber support structure to the wiper support structure and is configured to attach to a wiper arm of a vehicle.

18. A windshield wiper comprising:
a wiper assembly comprising:
a wiper support structure comprising a plurality of first cross arms extending longitudinally between a first end and a second end, each first cross arm having a mounting bracket positioned at each end thereof so that the mounting brackets are aligned; and
a wiper blade mounted to the mounting brackets of the wiper support structure; and
a scrubber assembly comprising:
a scrubber support structure removably attached to the wiper support structure, the scrubber support structure comprising a plurality of second cross arms, each extending longitudinally between opposing ends thereof, the second cross arms being arranged such that the ends of all of the second cross arms are aligned; and an elongated scrubber element movably coupled to the ends of the second cross arms, the scrubber element having a central longitudinal axis extending in the elongate direction between a first end and a spaced apart second end, the length of the scrubber element in the longitudinal direction being substantially the same as the length of the wiper blade in the longitudinal direction; and a motor mounted to the scrubber support structure, the motor engaged with the scrubber element to reciprocally move the scrubber element along the central longitudinal axis.

19. The windshield wiper recited in claim 18, wherein the scrubber element is configured to contact a windshield along the substantially entire longitudinal length of the scrubber element.

20. A scrubber assembly comprising:

a scrubber support structure configured to attach to a windshield wiper;

an elongated scrubber element movably attached to the scrubber support structure, the scrubber element having a central longitudinal axis extending in the elongate direction between a first end and a spaced apart second end, the scrubber element comprising:

an elongated reciprocating assembly, comprising:

an elongated reciprocating member; and a receiving member projecting from the reciprocating member in a direction orthogonal to the central longitudinal axis, the receiving member including an aperture that extends therethrough, a scrubbing member; and means for removably attaching the scrubbing member to the reciprocating assembly; and a motor mounted to the scrubber support structure, the motor being engaged with the reciprocating assembly so as to cause the scrubber element to reciprocally move along the central longitudinal axis, the motor comprising:

a shaft that rotates about a rotational axis, and an attaching member secured to the shaft so as to be offset from the rotational axis, the attaching member being inserted into the aperture of the receiving member so as to cause the reciprocating assembly to reciprocally move along the central longitudinal axis thereof when the shaft is rotated about the rotational axis.

\* \* \* \* \*